United States Patent [19]

Blount

[11] 4,226,982
[45] Oct. 7, 1980

[54] PROCESS TO BREAK DOWN CELLULOSE POLYMERS AND PRODUCE CELLULAR SOLID OR SOLID REACTION PRODUCTS

[76] Inventor: David H. Blount, 5450 Lea St., San Diego, Calif. 92105

[21] Appl. No.: 13,139

[22] Filed: Feb. 21, 1979

Related U.S. Application Data

[63] Continuation-in-part of Ser. No. 884,135, Mar. 7, 1978, Pat. No. 4,159,369, which is a continuation-in-part of Ser. No. 663,924, Mar. 4, 1976, Pat. No. 4,097,424, which is a continuation-in-part of Ser. No. 599,000, Jul. 7, 1975, Pat. No. 4,072,637, which is a continuation-in-part of Ser. No. 262,485, Jun. 14, 1972, abandoned, which is a continuation-in-part of Ser. No. 71,628, Sep. 11, 1970, abandoned.

[51] Int. Cl.³ .......................... C08B 1/08; C08J 9/02; C08G 18/02
[52] U.S. Cl. .......................... 536/101; 260/9; 260/17.2; 260/17.3; 260/17.4 R; 260/17.4 CL; 521/84; 521/125; 521/130; 521/175
[58] Field of Search ................. 536/101; 260/17.2 R, 260/17.4 R, 17.4 CL, 9, 17.3; 521/84, 125, 130, 175

[56] References Cited

U.S. PATENT DOCUMENTS

| 2,574,785 | 11/1951 | Heritage | 260/17.2 |
|---|---|---|---|
| 2,811,518 | 10/1957 | Mitchell et al. | 536/101 |
| 3,025,250 | 3/1962 | Herrick et al. | 260/17.2 |
| 3,255,071 | 6/1966 | Kleinert | 536/101 |
| 3,371,054 | 2/1968 | Blickensderfer et al. | 260/17.2 |
| 3,518,210 | 6/1970 | Edelstein et al. | 260/17.2 R |
| 3,821,135 | 6/1974 | King | 260/9 |
| 3,909,470 | 9/1975 | Lambuth et al. | 260/17.3 |
| 4,032,483 | 6/1977 | Hartman | 260/9 |
| 4,033,913 | 7/1977 | Sunden | 260/17.4 CL |
| 4,045,385 | 8/1977 | Klein et al. | 260/17.3 |
| 4,063,017 | 12/1977 | Tsao et al. | 536/57 |
| 4,072,640 | 2/1978 | Sosa | 260/17.4 CL |
| 4,076,663 | 2/1978 | Masuda et al. | 260/17.4 CL |
| 4,104,214 | 8/1978 | Meierhoefer | 260/17.4 CL |

FOREIGN PATENT DOCUMENTS

2644678  4/1978  Fed. Rep. of Germany ............ 536/56

OTHER PUBLICATIONS

Chemical Abstracts, vol. 84, Mar. 22, 1976, P. 75986u.
Chemical Abstracts, vol. 84, Apr. 5, 1976, p. 91214w.
Chemical & Engineering News, vol. 55, No. 30, Jul. 25, 1977, pp. 1 and 16.

*Primary Examiner*—Ronald W. Griffin

[57] ABSTRACT

Small particles of cellulose-containing plants are mixed with an alkali metal hydroxide, such as lye flakes, in the ratio of about 2 parts by weight of the plant to 1 to 3 parts by weight of the alkali metal hydroxide, then heated to 150° C. to 220° C. for 5 to 60 minutes while agitating until the plant particles soften or melt, thereby producing broken-down cellulose polymers in the form of dark brown particles or powder.

35 Claims, No Drawings

PROCESS TO BREAK DOWN CELLULOSE POLYMERS AND PRODUCE CELLULAR SOLID OR SOLID REACTION PRODUCTS

CROSS-REFERENCE TO RELATED APPLICATIONS

This application is a continuation-in-part of my earlier filed pending application Ser. No. 884,135 filed Mar. 7, 1978, now U.S. Pat. No. 4,159,369; which application is a continuation-in-part of an earlier application copending therewith Ser. No. 663,924, filed Mar. 4, 1976, now U.S. Pat. No. 4,097,424; which application is a continuation-in-part of an earlier application copending therewith Ser. No. 599,000, filed July 7, 1975, now U.S. Pat. No. 4,072,637; which application is a continuation-in-part of an earlier application therewith, Ser. No. 262,485 filed June 14, 1972, now abandoned; which is a continuation-in-part of an earlier application copending therewith Ser. No. 71,628, filed Sept. 11, 1970, now abandoned.

BACKGROUND OF THE INVENTION

This invention relates to a novel and economical process to break down particles of cellulose-containing plants into smaller polymers and compounds which are highly reactive chemically and are soluble in water and/or common organic solvents.

The process in this invention differs from the process commonly known in the arts to produce alkali metal cellulose by heating the cellulose in a concentrated aqueous solution of the alkali metal hydroxide to break down the cellulose polymers; the alkali metal cellulose produced is not soluble in water and must be reacted with carbon disulfide before it is water soluble. In the process of this invention, aqueous solutions are not used and a much higher temperature is necessary to break down the cellulose polymers in plants in order for it to be water soluble. It is not necessary to remove the lignin for wood in the process of this invention. When an organic or inorganic acid is added to the broken-down alkali metal cellulose polymer, carbon dioxide is given off. The dark brown alkali metal cellulose polymer is usually converted to a cream color after the cellulose is reacted with other organic reactants, especially in an acetic medium.

When wood is used as the cellulose-containing plant, the usual lignin-cellulose bond is not broken in most of the cases, but the molecules of cellulose are broken down into smaller molecules which are water soluble and highly reactive chemically, especially with aldehydes, furan compounds, polyisocyanate compounds and polyurethane prepolymers.

The broken-down polymers of cellulose-containing plants are commercially useful polymers. The alkali cellulose of cellulose-containing plants is highly reactive. It will produce useful resins by reacting with aldehydes, ketones, isocyanates, vinyl acetate acrylic acid monomers, polyfunctional alkylating agents, monofunctional alkylating agents, aldehydes and phenols, aldehydes and amino compounds, vinyl acetate with other vinyl monomers, acrylic acid compounds with other vinyl monomers, epihalohydrins with polyamines, oxidated silicon compounds, sulfur, silicon halides, organic polyhalides and polyamines, furfuryl alcohol, compounds which contain halogen atoms capable of being quaternized or R—SO$_2$—groups, epoxide compounds and mixtures thereof.

The aqueous solution of the alkali metal cellulose polymers of cellulose-containing plants may be used commercially to react with polyisocyanate and isocyanate-terminated polyurethane prepolymers and isocyanate-terminated polyurethane silicate prepolymers. They may be polymerized with organic aldehydes, furfuryl alcohol, epihalohydrins and polyamine organic polyhalide compounds, organic epichlorohydrin compounds and a polyamine halohydrins, ketones, organic epoxides, acrylic compounds, vinyl acetate, organic halides, organic polyhalides, organic acid sulfates, organic poly(acid sulfates), organic nitrates, organic polynitrates, organic acid phosphates, organic poly(acid phosphates), organic bicarbonate, organic poly(bicarbonate) compounds containing radicals, organic compounds containing formate radicals, organic compounds containing poly(formate) radicals, organic compounds containing acetate, propionate, laurate, oleate, stearate, oxalate, acid malonate, acid tartrate, acid citrate radical and mixtures thereof.

The water-soluble broken-down alkali metal cellulose polymer may be precipitated by the addition of a salt-forming compound, such as an organic or inorganic acid. The water is filtered off. The water contains 5% to 30% by weight of plant polymers and, in the case of wood, some lignin is present. The degraded cellulose polymers are precipitated as dark brown to black fine particles which are soluble in acetic acid, alcohols, dilute alkali hydroxide solutions and other organic solvents. The broken-down cellulose polymers may be chemically reacted with isocyanate compounds, polyisocyanate compounds, polythioisocyanate compounds, silicon halides, polycarboxyl acids and their corresponding anhydride, epoxides, aldehydes, ketones, furfuryl alcohol, epihalohydrins and mixtures thereof.

The water-soluble broken-down cellulose polymers and lignin are soluble in acetic and basic aqueous solutions. They may be used in the aqueous solution to produce resins by reacting with furfural, furfuryl alcohol, aldehyde and an amino compound, aldehyde and a phenol compound, aldehydes, ketones, epoxides and polyamines, polyhalide organic compounds and polyamines, isocyanates and mixtures thereof. The salt may be removed by washing the resins with water and filtering. The water-soluble broken-down cellulose polymers may be recovered by evaporating the water, then extracting the polymers from the salt by using an organic solvent, and then evaporating the organic solvent. The tan-colored cellulose polymer may be used in the production of polyurethane resins and foams, phenoplast, aminoplasts, aldehyde cellulose resins, ketone cellulose resins, furfuryl alcohol-cellulose resins, cellulose silicone polymers and as a filler in paints, varnishes, organic resins, etc.

When desirable, a higher percentage of alkali metal cellulose polymers may be produced, which are not water soluble, be regulating the temperature and the length of time the alkali metal hydroxide and cellulose-containing plants are heated. These polymers are highly reactive, as previously discussed.

Any suitable cellulose-containing plant or the products of cellulose-containing plants which contain cellulose may be used in this invention. The plant material is preferred to be in the form of small particles such as sawdust. In nature, cellulose is widely distributed. It is found in all plants and they may be used in this process, preferably in a dry, small-particle form.

Suitable cellulose-containing plants include, but are not limited to, trees, e.g., spruce, pine, hemlock, fir, oak, ash, larch, birch, aspen, poplar, cedar, beech, maple, walnut, cypress, redwood, cherry, elm, chestnut, hickory, locust, sycamore, tulip, tupelo, butternut, apple, alder, magnolia, dogwood, catalpa, boxwood, crabwood, mahogany, greenheart, lancewood, letterwood, mora, prima vera, purpleheart, rosewood, teak, satinwood, mangrove, wattle, orange, lemon, logwood, fustic, osage orange, sappanwood, Brazilwood, barwood, camwood, sandalwood, rubber, gutta, mesquite, and shrubs, e.g., oleander, cypress, junipers, acanthus, pyracantha, ligustrum, lantana, bougainvillea, azalea, feijoa, ilex, fuscia, hibiscus, datura, holly, hydrangea, jasmine, eucalyptus, cottoneaster, xylosma, rhododendron, castor bean, eugenia, euonymus, fatshedera, aralia, etc., and agricultural plants, e.g., cotton, cotton stalks, corn stalks, corn cobs, wheat straw, oat straw, rice straw, cane sugar (bagasse), soybean stalks, peanut plants, pea vines, sugar beet waste, sorghum stalks, tobacco stalks, maize stalks, barley straw, buckwheat straw, quinoa stalks, cassava, potato plants, legume vines and stalks, vegetable inedible portion, etc., weeds, grasses, vines, kelp, flowers and algae. Wood fibers and cotton fibers are the preferred cellulose-containing materials. The waste products of agricultural plants which contain cellulose may be air-dried, then ground into small particles and used in this invention. Commercial waste products containing cellulose, e.g., paper, cotton cloths, bagasse wallboard, wood products, etc., may be used in this invention. Wood with the lignin removed (wood pulp) may be used in this invention.

Cellulose-containing plants which have been partially decomposed, such as humus, peat and certain soft brown coal, may be used in this invention.

Other products of cellulose-containing plants may be recovered in the process of this invention such as waxes, gums, oils, sugars, wood alcohol, agar, rosin, turpentine, resins, rubber latex, dyes, etc.

Any suitable aldehyde may be used in this invention, such as formaldehyde, acetaldehyde, butyl aldehyde, chloral, acrolein, furfural, benzaldehyde, crotonaldehyde, propionaldehyde, pentanals, hexanals, heptanals, octanals and their simple substitution products, semiacetals and full acetals, paraformaldehyde and mixtures thereof. Compounds containing active aldehyde groups such as hexamethylene tetramine may also be used.

Any suitable amino compound may be used in this invention such as urea, thiourea, alkyl-substituted thiourea, alkyl-substituted ureas, aniline, melamine, aniline, quanidine, saccharin, dicyandiamide, benzene sulfonamides, toluene sulfonamide, aliphatic and aromatic polyamines and mixtures thereof. Urea is the preferred amino compound, and formaldehyde is the preferred aldehyde when used with an amino compound.

Any suitable phenol compound may be used in this invention such as phenol, p-cresol, o-cresol, m-cresol, cresylic acid, xylenols, resorcinol, cashew nut shell liquids, anacordol, p-tert-butyl phenol, Bisphenol A, creosote oil, 2,6-dimethylphenol and mixtures thereof. Phenol is the preferred phenol compound and formaldehyde is the preferred aldehyde when used with a phenol compound.

Any suitable mixture of the amino compounds and phenol compounds with an aldehyde may be used in this invention.

Any suitable acid compound, inorganic or organic, may be used for salt formation, including those which also have a chainbuilding function such as sulphurous acid, sulphuric acid, hypophosphorous acid, phosphinic acids, phosphonous acids and phosphonic acid, glycolic acid, lactic acid, succinic acid, tartaric acid, oxalic acid, phthalic acid, trimellitic acid and the like. Further examples of acids may be found in German Pat. No. 1,178,586 and in U.S. Pat. No. 3,480,592. Acids such as hydrochloric, fluoroboric acid, amidosulphonic acid, phosphoric acid and its derivatives, acetic acid, propionic acid, etc., may be used. Inorganic hydrogen-containing salts may be used such as sodium hydrogen sulphate, potassium hydrogen sulphate, sodium dihydrogen phosphate, potassium dihydrogen phosphate and mixtures thereof.

The acid compounds may be used to react with the alkali metal atoms in the alkali metal cellulose polymer to produce a salt and also release $CO_2$ which expands the cellulose polymer into a cellular solid product. The acid compounds may also be used as a catalyst in the reactions to produce foamed aminoplast-cellulose products, foamed phenoplast-cellulose products and aminoplast-cellulose-phenoplast foamed products. These acid compounds may also be used in the production of polyurethane-cellulose cellular solid products to react with the alkali metal atoms to form a salt. The acid compounds may be used to precipitate the alkali metal cellulose from an aqueous solution.

Any suitable oxidated silicon compound may be used in this invention such as silica, e.g., hydrated silica, silicoformic acid, silica sol, etc., alkali metal silicates, alkaline earth metal silicates, natural silicates with free silicic acid groups and mixtures thereof. The hydrated silica includes various silicon acids such as silicic acid gel, orthosilicic acid, metasilicic acid, monosilandiol, polysilicoformic acid, etc. Hydrated silica is the preferred oxidated silicon compound.

Any suitable organic polyisocyanate may be used according to the invention, including aliphatic, cycloaliphatic, araliphatic, aromatic and heterocyclic polyisocyanates. Suitable polyisocyanates are, for example, arylene polyisocyanates such as tolylene, metaphenylene; 4-chlorophenylene-1,3-; methylene-bis-(phenylene-4-); biphenylene-4,4'-; 3,3-dimethoxy-biphenylene-4,4'-; 3,3'-diphenylbiphenylene-4,4'-; naphthalene-1,5- and tetrahydronaphthalene-1,5-diisocyanates and triphenylmethane triisocyanate; alkylene polyisocyanates such as ethylene, ethylidene; propylene-1,2-; butylene-1,4-; butylene-1,3-; hexylene-1,6-; decamethylene-1,10-; cyclohexylene-1,2-; cyclohexylene-1,4-; and methylene-bis-(cyclohexyl-4,4'-) diisocyanates.

It is generally preferred to use commercially readily available polyisocyanates, e.g., tolylene-2,4- and -2,6-diisocyanate and any mixtures of these isomers, ("TDI"), polyphenylpolymethylene-isocyanates obtained by aniline-formaldehyde condensation followed by phosgenation ("crude MDI"), and polyisocyanates which contain carbodiimide groups, urethane groups, allophanate groups, isocyanurate groups, urea groups, imide groups or biuret groups, ("modified polyisocyanates"). Inorganic polyisocyanates are also suitable according to the invention. Suitable polyisocyanates which may be used according to the invention are described, e.g., by W. Siefken in Justus Liebigs Annalen der Chemie, 562, pages 75 to 136.

Solutions of distillation residues accumulating during the production of tolylene diisocyanate, diphenyl methane diisocyanate or hexamethylene diisocyanate, in monomeric polyisocyanates or in organic solvents and mixtures thereof may be used in this process. Phosgenation products of condensates of aniline or anilines alkyl-substituted on the nucleus, with aldehydes or ketones, may be used in this invention.

Organic polyhydroxyl compounds (polyols) may be used in this invention with polyisocyanates or may be first reacted with a polyisocyanate to produce isocyanate-terminated polyurethane prepolymers and then also used in this invention.

Reaction products of from 50 to 99 mols of aromatic diisocyanates with from 1 to 50 mols of conventional organic compounds with a molecular weight of, generally, from about 400 to about 10,000, which contain at least two hydrogen atoms capable of reacting with isocyanates, may also be used. While compounds which contain amino groups, thiol groups or carboxyl groups may be used, it is preferred to use organic polyhydroxyl compounds, in particular, compounds which contain from 2 to 8 hydroxyl groups, especially those with a molecular weight of from about 800 to about 10,000 and preferably from about 1,000 to about 6,000, e.g., polyesters, polyethers, polythioethers, polyacetals, polycarbonates or polyester amides containing at least 2, generally from 2 to 8, but preferably from 2 to 4, hydroxyl groups, of the kind known for producing homogeneous and cellular polyurethanes.

The hydroxyl group containing polyesters may be, for example, reaction products of polyhydric alcohols, preferably dihydric alcohols, with the optional addition of trihydric alcohols, and polybasic, preferably dibasic, carboxylic acids. Instead of the free polycarboxylic acids, the corresponding polycarboxylic acid anhydrides or corresponding polycarboxylic acid esters of lower alcohols or their mixtures may be used for preparing the polyesters. The polycarboxylic acid may be aliphatic, cycloaliphatic, aromatic and/or heterocyclic and may be substituted, e.g., with halogen atoms and may be unsaturated. Examples include: succinic acid, adipic acid, sebacic acid, suberic acid, azelaic acid, phthalic acid, phthalic acid anhydride, isophthalic acid, tetrahydrophthalic acid anhydride, trimellitic acid, hexahydrophthalic acid anhydride, tetrachlorophthalic acid anhydride, endomethylene tetrahydrophthalic acid anhydride, glutaric acid anhydride, fumaric acid, maleic acid, maleic acid anhydride, dimeric and trimeric fatty acids such as oleic acid, optionally mixed with monomeric fatty acids, dimethylterephthalate and bis-glycol terephthalate. Any suitable polyhydric alcohol may be used such as, for example, ethylene glycol; propylene-1,2- and -1,3-glycol; butylene-1,4- and -2,3-glycol; hexane-1,6-diol; octane-1,8-diol; neopentyl glycol; cyclohexanedimethanol-(1,4-bis-hydroxymethylcyclohexane); 2-methyl-propane-1,3-diol; glycerol; trimethylol propane; hexane-1,2,6-triol; butane-1,2,4-triol; trimethylol ethane; pentaerythritol; quinitol; mannitol and sorbitol; methylglycoside; diethylene glycol; triethylene glycol; tetraethylene glycol; polyethylene glycols; dipropylene glycol; polypropylene glycols; dibutylene glycol and polybutylene glycols. The polyesters may also contain a proportion of carboxyl end groups. Polyesters of lactones, such as ε-caprolactone, or hydroxycarboxylic acids such as ω-hydroxycaproic acid, may also be used.

The polyethers with at least 2, generally from 2 to 8 and preferably 2 or 3, hydroxyl groups used according to the invention are known and may be prepared, e.g., by the polymerization of epoxides, e.g., ethylene oxide, propylene oxide, butylene oxide, tetrahydrofuran, styrene oxide or epichlorohydrin, each with itself, e.g., in the presence of $BF_3$, or by addition of these epoxides, optionally as mixtures or successively, to starting components which contain reactive hydrogen atoms such as alcohols or amines, e.g., water, ethylene glycol; propylene-1,3 or 1-2-glycol; trimethylolpropane; 4,4-dihydroxydiphenylpropane, aniline, ammonia, ethanolamine or ethylenediamine. Sucrose polyesters such as those described, e.g., in German Auslegeschriften Nos. 1,176,358 and 1,064,938, may also be used according to the invention. It is frequently preferred to use polyethers which contain predominantly primary OH groups, (up to 90% by weight, based on the total OH groups contained in the polyether). Polyethers modified with vinyl polymers such as those which may be obtained by polymerizing styrene or acrylonitrile in the presence of polyethers, (U.S. Pat. Nos. 3,383,351; 3,304,273; 3,523,093 and 3,110,695; and German Patent No. 1,152,536) and polybutadienes which contain OH groups are also suitable.

By "polythioethers" are meant, in particular, the condensation products of thiodiglycol with itself and/or with other glycols, dicarboxylic acids, formaldehyde, aminocarboxylic acids or amino alcohols. The products obtained are polythio-mixed ethers or polythioether ester amides, depending on the cocomponent.

The polyacetals used may be, for example, the compounds which may be obtained from glycols, e.g., diethylene glycol, triethylene glycol, 4,4'-dihydroxydiphenylmethylmethane, hexanediol, and formaldehyde. Polyacetals suitable for the invention may also be prepared by the polymerization of cyclic acetals.

The polycarbonates with hydroxyl groups used may be of the kind, e.g., which may be prepared by reacting diols, e.g., propane-1,3-diol; butane-1,4-diol; and/or hexane-1,6-diol or diethylene glycol; triethylene glycol or tetraethylene glycol, with diarylcarbonates, e.g., diphenylcarbonates or phosgene.

The polyester amides and polyamides include, e.g., the predominantly linear condensates obtained from polyvalent saturated and unsaturated carboxylic acids or their anhydrides and polyvalent saturated and unsaturated amino alcohols, diamines, polyamines and mixtures thereof.

Polyhydroxyl compounds which already contain urethane or urea groups, modified or unmodified natural polyols, e.g., castor oil, carbohydrates and starches, may also be used. Additional products of alkylene oxides with phenolformaldehyde resins or with urea-formaldehyde resins are also suitable for the purpose of the invention.

Examples of these compounds which are to be used according to the invention have been described, e.g., in High Polymers, Volume XVI, "Polyurethanes, Chemistry and Technology", published by Saunders-Frisch Interscience Publishers, New York, London, Volume I, 1962, pages 32 to 42 and pages 44 to 54 and Volume II, 1964, pages 5 to 6 and 198 to 199; and in Kunststoff-Handbuch, Volume VII, Vieweg-Hochtlen, Carl-Hanser-Verlag, Munich, 1966, e.g., on pages 45 to 71.

If the polyisocyanates or the prepolymer which contains NCO groups have a viscosity above 2000 cP at 25° C., it may be advantageous to reduce the viscosity thereof by mixing it with a low-viscosity organic polyisocyanate and/or an inert blowing agent or solvent.

Inorganic polyisocyanates and isocyanate-terminated polyurethane silicate prepolymers may also be used in this invention.

When an aqueous solution of alkali metal cellulose polymer is being used to react with, or as a curing agent for, polyisocyanates, it is advantageous in certain cases to use catalysts such as tertiary amines, e.g., triethylamine, tributylamine, N-methyl-morpholine, N-ethyl-morpholine, tetramethylthylenediamine, pentamethyldiethylenetriamine, triethanolamine, triisopropanolamine, organo-metallic compound, e.g., tin acetate, tin octoate, tin ethyl hexoate, dibutyl tin diacetate, dibutyl tin dilaurate and mixtures thereof.

Other examples of catalysts which may be used according to the invention and details of their action are described in Kunstsoff-Handbuch, Volume VII, published by Vieweg and Hochtlen, Carl-Hanser-Verlag, Munich, 1966, e.g., on pages 96 and 102. Silaamines are suitable catalysts, e.g., 2,2,4-trimethyl-2-silamorpholine or 1,3-diethyl aminomethyl tetramethyl disiloxane. Suitable catalysts are also tetraalkyl ammonium hydroxides, alkali phenolates, alkali metal hydroxides, alkali phenolates, alkalialcoholates and hexahydrotriazines.

Suitable flame-resistant compounds may be used which contain halogen or phosphorus, e.g., tributylphosphate; tris(2,3-dichloropropyl)-phosphate; polyoxypropylenechloromethylphosphonate; cresyldiphenylphosphate; tricresylphosphate; tris-(bets-chloroethyl)-phosphate; tris-(2,3-dichloropropyl)-phosphate; triphenylphosphate; ammonium phosphate; perchlorinated diphenyl; perchlorinated terephenyl; hexabromocyclodecane; tribromophenol; dibromopropylidiene; hexabromobenzene; octabromodiphenylether; pentabromotoluol; poly-tribromostyrol; tris-(bromocresyl)-phosphate; tetrabromobis-phenol A: tetrabromophthalic acid anhydride; octabromodiphenyl; tri-(dibromopropyl)-phosphate; calcium hydrogen phosphate; sodium or potassium dihydrogen phosphate; disodium or dipotassium hydrogen phosphate; ammonium chloride; phosphoric acid; polyvinylchloride tetomers chloroparaffins as well as further phosphorus- and/or halogen-containing flame-resistant compounds as they are described, e.g., in "Kunststoff-Handbuch", Volume VII, Munich 1966, pages 110–111, which is incorporated herein by reference. The organic halogen-containing components are, however, preferred in the polyurethane-cellulose and polyurethane-cellulose-silicate cellular solid products. In the production of aldehyde cellulose, amino-aldehyde-cellulose and phenolaldehyde-cellulose cellular solid product, phosphoric acid may be used to react with the alkali metal atoms, thereby producing an alkali metal hydrogen phosphate which may be used as the flame-resistant compound.

DETAILED DESCRIPTION OF THE INVENTION

The preferred process to produce the water-soluble alkali metal cellulose polymer is to mix about 2 parts by weight of air-dried fine particles of a cellulose-containing plant with 1 to 3 parts by weight of an alkali metal hydroxide compound, then to heat the mixture at ambient pressure while agitating at 150° C. to 220° C. for 5 to 60 minutes, thereby producing an alkali metal cellulose polymer. The alkali metal cellulose polymer softens or melts into a thick liquid at 150° C. to 220° C. and when it cools, it forms a solid mass, dark brown in color.

The alkali metal cellulose is soluble in water and organic solvents such as alcohols, epichlorohydrin, chlorohydrin and other organic solvents.

The alkali metal cellulose may be neutralized (pH 7) with an acid compound to produce a foamed cellulose product by the production of $CO_2$ when the acid reacts with the alkali metal atoms to form a salt. The foam cellulose product may be dried and utilized for thermal and sound insulation in construction of buildings, cars, boats and airplanes. The foamed cellulose may be washed and filtered to remove the salt.

In an additional preferred process, about 2 parts by weight of the alkali metal cellulose polymer produced by the process of the invention are mixed with 1 to 5 parts by weight of an aldehyde, then agitated at ambient temperature for 10 to 60 minutes, thereby producing an aldehyde-alkali metal cellulose copolymer. The aldehyde-alkali metal cellulose copolymer may be reacted with an acid compound until the pH is 6 to 7, thereby producing cellular solid aldehyde-cellulose copolymer. The salt is removed by washing and filtering.

In an additional preferred process, about 2 parts by weight of the alkali metal cellulose polymer produced by the process of this invention are mixed with 1 to 5 parts by weight of an amino compound and 0.5 to 5 mols of an aldehyde for each mol of the amino compound, then agitated at a temperature between ambient temperature and 100° C. for from 10 minutes to 12 hours, thereby producing an aminoplast-alkali metal cellulose resin; then an acid compound is added until the pH is 5 to 7, while agitating until the resin begins to expand, thereby producing a cellular solid aminoplast-cellulose product.

In an additional preferred process, about 2 parts by weight of the alkali metal cellulose polymer produced by the process of this invention are mixed with 1 to 5 parts by weight of a phenol compound and 1 to 5 mols of an aldehyde per mol of the phenol compound, then agitated at a temperature from ambient to 100° C. for from 10 minutes to 12 hours, thereby producing a phenoplast-alkali metal cellulose resin; then an acid compound is added until the pH is 5 to 7 while agitating for a few seconds until the mixture begins to expand, thereby producing a cellular solid phenoplast-cellulose product.

The processes to produce cellular solid aminoplast-cellulose and phenoplast-cellulose cellular solid products may be combined to produce cellular solid phenoplast-cellulose-aminoplast products.

In an additional preferred process, 1 to 4 parts by weight of the alkali metal cellulose polymer produced by the process of this invention and 3 parts by weight of an isocyanate-terminated polyurethane prepolymer are rapidly mixed, and in a few seconds to about 120 minutes, the mixture expands 3 to 12 times its original volume to produce a cellular solid polyurethane-cellulose product.

In an additional preferred process, one part by weight of aqueous solution containing 20% to 60% of the alkali metal cellulose produced by the process of this invention is mixed with 1 to 10 parts by weight of an organic polyisocyanate or polyisothiocyanate; then in a few seconds to 120 minutes, the reaction is complete, thereby producing a polyisocyanate-cellulose cellular solid or solid product.

In an additional preferred process, about 10 parts by weight of an aqueous solution containing 20% to 60% by weight of the alkali metal cellulose polymer produced by the process of this invention are mixed with 10 to 100 parts by weight of an isocyanate-terminated polyurethane prepolymer and 0.001 to 0.01 parts by weight of an amine catalyst; then in a few seconds to 120 minutes, the reaction is complete, thereby producing a polyisocyanate-cellulose cellular solid or solid product.

In an additional preferred process, 1 to 3 parts by weight of the alkali metal cellulose polymer as produced by the process of this invention, 1 to 3 parts by weight of an oxidated silicon compound, 1 to 3 parts by weight of a polyol and 3 parts by weight of an organic polyisocyanate or polyisothiocyanate are rapidly mixed; then in a few seconds to 120 minutes, the reaction is complete, thereby producing a polyurethane-cellulose-silicate cellular solid or solid product.

In an additional preferred process, two parts by weight of the alkali metal cellulose produced by the process of this invention are mixed with 1 to 4 parts by weight of an organic polyisocyanate, then agitated for 10 to 60 minutes at a temperature between 20° C. to 70° C., thereby producing a polyisocyanate-alkali metal cellulose prepolymer; then 10% to 100% by weight of a curing agent, based on weight of the prepolymer, is added to the prepolymer while agitating at 20° C. to 80° C. for 5 to 20 minutes, thereby producing a cellular solid or solid polyisocyanate-cellulose product.

In an additional preferred process, 1 to 3 parts by weight of the alkali metal cellulose produced by the process of this invention, 1 to 3 parts by weight of a polyol and 1 to 3 parts by weight of an organic polyisocyanate are rapidly mixed at ambient temperature and pressure and in a few seconds to 5 minutes, the mixture expands 3 to 12 times its original volume, thereby producing a cellular solid polyurethane-cellulose product.

When the alkali cellulose polymer produced by this invention is reacted with an acid compound, $CO_2$ is given off, and a foamed cellulose product is produced. In cases where inadequate $CO_2$ is produced to form cellular solid cellulose products, a blowing agent may be used. The blowing agent may be added to the alkali cellulose polymer or to an aqueous solution of the alkali cellulose polymer before the acid compound is added. The blowing agent may be also added with the acid compound. The chemical reaction between the acid compound and the alkali metal atoms will usually produce enough heat to evaporate or expand the blowing agent.

Readily volatile blowing agents, e.g., dichlorodifluoromethane, trichlorofluoromethane, butane, isobutylene or vinyl chloride, may be used to produce cellular solid products in this invention. In addition, the liquid reaction mixtures can be expanded into a foam by the introduction of gases, optionally under pressure, such as air, methane, $CF_4$, noble gases and $H_2O_2$, the resulting foam being introduced into the required mold and hardened therein. The resultant foam may optionally contain foam stabilizers such as surfactants, foam formers, emulsifiers and, if desired, other organic or inorganic fillers or diluents may initially be converted by blowing gas into a foam and the resulting foam subsequently mixed in a mixer with the other components, the resulting mixture being allowed to harden. Instead of blowing agents, it is also possible to use inorganic or organic, finely divided hollow bodies such as expanded hollow beads of glass, plastic, straw, expanded clay, and the like, for producing foams.

The foams obtainable in this way can be used either in their dry or their moist form if desired after a compacting or tempering process, optionally carried out under pressure, as insulating materials, cavity fillings, packaging materials, building materials, etc. They can also be used in the form of sandwich elements, for example, with metal-covering layers, in house, vehicle and aircraft construction.

It is also possible to introduce into the foaming reaction mixtures, providing they are still free-flowing, organic and/or inorganic foamable or already foamed particles, for example, expanded clay, expanded glass, wood, popcorn, cork, hollow beads of plastics, for example, vinyl chloride polymers, polyethylene, styrene polymers or foam particles thereof or even, for example, polysulphone, polyepoxide, polyurethane, ureaformaldehyde, phenol formaldehyde, polyimide polymers, urea-silicate-formaldehyde polymers, phenol-silicate-formaldehyde, epoxy silicate polymers, polyisocyanate silicate polymers, polyurethane silicate polymers or the reaction mixture may be allowed to foam through interstitial spaced particles in packed volumes of these particles and, in this way, to produce insulating materials. Combinations of expanded clay, glass or slate with the reaction mixture, according to the invention, are especially preferred.

It is also possible to introduce into the foaming reaction mixtures, providing they are still free-flowing, at a predetermined temperature, a blowing agent which is capable of evaporation or of gas formation at these temperatures, for example, a halogenated hydrocarbon. The initial liquid mixture formed can be used not only for producing uniform foams or non-uniform foams containing foamed or unfoamed fillers, but it can also be used to foam through any given webs, woven fabrics, lattices, structural elements or other permeable structures of foamed materials, resulting in the formation of composite foams with special properties, for example, favorable flame behavior, which may optionally be directly used as structural elements in the building, furniture or vehicle and aircraft industries.

The cellular solid products (foams) according to the invention can be added to soil in the form of crumbs, optionally in admixtures with fertilizers and plant-protection agents, in order to improve its agrarian consistency.

Since the hardened foams obtained by the process according to the invention can show considerable porosity after drying, they are suitable for use as drying agents because then can absorb water; however, they can also be charged with active substances or used as catalyst supports or filters and absorbents.

On the other hand, the foams can be subsequently lacquered, metallized, coated, laminated, galvanized, subjected to vapor deposition, bonded or flocked in either their moist or dry form or in impregnated form. The moldings can be further processed in their moist or dried form, for example, by sawing, milling, drilling, planing, polishing and other machining techniques. The optionally filled moldings can be further modified in their properties by thermal after-treatment, oxidation processes, hot-pressing, sintering processes or surface melting or other consolidation processes. Suitable mold materials include inorganic and/or organic foamed or unfoamed materials such as metals, for example, iron, nickel, fine steel, lacquered or, for example, teflon-coated aluminum, porcelain, glass, wood, plastics such as PVC, polyethylene, epoxide resins, ABS, polycarbonate, etc.

Fillers in the form of particulate or powdered materials can be additionally incorporated into the liquid mixtures of the foamable reactants for a number of applications.

Suitable fillers include solid inorganic or organic substances, for example, in the form of powders, granulate, wire, fibers, dumb bells, crystallites, spirals, rods, beads, hollow beads, foam particles, webs, pieces of woven fabric, knit fabrics, ribbons, pieces of film, etc., for example, of dolomite, chalk, alumina, asbestos, basic silicas, sand, talcum, iron oxide, aluminum oxide and oxide hydrate, zeolites, calcium silicates, basalt wool or powder, glass fibers, C-fibers, graphite, carbon black, Al-, Fe-, Cu-, Ag-powder, molybdenum sulphite, steel wool, bronze or copper cloth, silicon powder, expanded clay particles, hollow glass beads, glass powder, lava and pumice particles, wood chips, sawdust, cork, cotton, straw, jute, sisal, hemp, flax, rayon, popcorn, coke, particles of filled or unfilled, foamed or unfoamed, stretched or unstretched, organic polymers including plastics and rubber waste. Of the number of suitable organic polymers, the following, which can be present, for example, in the form of powders, granulate, foam particles, beads, hollow beads, foamable or unfoamed particles, fibers, ribbons, woven fabrics, webs, etc., are mentioned purely by way of examples: polystyrene, polyethylene, polypropylene, polyacrylonitrile, polybutadiene, polyisoprene, polytetrafluoroethylene, aliphatic and aromatic polyesters, melamine-urea or phenol resins, polyacetal resins, polyepoxides, polyhydantoins, polyurea, polyethers, polyurethanes, polyimides, polyamides, polysulphones, polycarbonates, and, of course, any copolymers as well. Inorganic fillers are preferred.

Generally, the composite materials according to the invention can be filled with considerable quantities of fillers without losing their valuable property spectrum. The amount of fillers can exceed the amount of the reactants. In special cases, the foamed products of the present invention act as a binder for such fillers.

Basically, the production of the cellular solid products according to the invention is carried out by mixing the reactants in one or more stages in a continuously- or intermittently-operating mixing apparatus and then allowing the resulting mixture to foam and solidify, usually outside the mixing apparatus in molds, or on suitable materials. The reaction temperature required for this, which may be from 0° C. to 200° C. and preferably from 20° C. to 160° C., may either be achieved by heating one or more of the reactants before the mixing process or by heating the mixing apparatus itself or, alternatively, by heating the reaction mixture after the components have been mixed. Combinations of these or other methods of adjusting the reaction temperature may, of course, also be employed. In most cases, sufficient heat is evolved during the reaction to enable the reaction temperature to rise to values above 50° C. after the reaction or foaming has begun.

In particular, however, the process according to the invention is suitable for in situ foaming on the building site. Any hollow forms obtained by means of shuttering in the conventional way may be filled up and used for foaming in this way.

The alkali cellulose polymers as produced in this invention may be pre-reacted with an aldehyde, then foamed by the addition of an acid compound. The foamed particles may be dried and used as insulation material by pouring a layer of the particles between rafters and studs in houses, buildings, etc.

The alkali cellulose polymers as produced in this invention may be pre-reacted with an amino compound and an aldehyde to produce a liquid alkali cellulose-amino-aldehyde, then placed in a mixing chamber, optionally adding a blowing agent, emulsifier, foam stabilizer, filler, flame-retardant and other additives, then rapidly mixed with an acid compound and then pumped or blown by compressed air into a mold such as a wall, ceiling, etc., while expanding, thereby producing a cellular solid product, useful for sound and thermal insulation. The foaming components may also be pumped into a large mold to expand and harden into a cellular product. The cellular product may be sawed into slabs and used for insulation in houses, boats, vehicles, airplanes, etc. The cellular product may also be chopped by a suitable machine into particles and poured or blown into places such as ceilings, walls, etc., and used for thermal and sound insulation. The cellular product may also be used as a molding powder and molded into useful products by heat and pressure in a mold.

The alkali cellulose polymer as produced in this invention may be pre-reacted with a phenol compound and an aldehyde to produce a liquid polymer. This liquid polymer may be foamed in the same manner as the amino-aldehyde-cellulose polymers and may be used for the same purposes, sound and thermal insulation, molding powder and in the production of paints, varnishes, adhesives, etc. The liquid phenoplast cellulose polymer may be poured into a mold, then heated for 1 to 6 hours, thereby producing a tough, solid, useful product.

The alkali cellulose polymer as produced in this invention may be pre-reacted with a phenol compound, an amino and an aldehyde compound to produce a liquid resin. This liquid resin may be poured into a mold, then heated to 70° C. to 100° C. for 1 to 6 hours, thereby producing a tough, solid, useful product. This liquid resin may also be foamed on the job by adding the liquid resin and an acid compound (catalyst) simultaneously to a mixing chamber, then rapidly pumping or using air pressure to transfer the foaming mixture into a mold such as walls, ceilings, etc., where it rapidly sets within a few seconds to several minutes into a tough, rigid, somewhat elastic, cellular solid product, optionally containing blowing agent, emulsifier, foam stabilizer, filler, flame-retardant agents and other additives. The product has good sound and thermal qualities, good flame-retardant properties and good dimentional stability. The phenoplast-cellulose-aminoplast resins may be used as molding powder and molded by heat and pressure into useful objects. The phenoplast-cellulose-aminoplast resin may be foamed into large slabs, then sawed into various sizes and thicknesses or broken into small particles and used for thermal and sound insulation in houses, buildings, vehicles and aircrafts; these large slabs of foam may be sawed into various thicknesses and widths, then a moisture barrier such as aluminum foil may be applied by the use of an adhesive to produce an insulation material that has excellent flame-resistant properties, good strength and excellent thermal- and sound-insulation qualities.

The process according to the invention to produce the polyisocyanate cellulose foam, polyurethane cellulose foam and polyurethane-silicate-cellulose foam is particularly suitable, however, for in situ foaming on the building site. Any hollow molds normally produced by shuttering in forms can be obtained by casting and foaming. The reaction mixture, optionally containing a blowing agent, emulsifier, foam stabilizer, filler, flame-retardant agent, diluents, deodorants, coloring agents and other agents, produced by adding the components simultaneously to a mixing apparatus, is immediately pumped or sprayed by compressed air into a mold, e.g., walls, ceilings, cold or heated relief molds, solid molds, hollow-molds, etc., where it may be left to harden. The foaming reaction mixture may also be forced, cast or injection molded into cold or heated molds, then hardened, optionally under pressure and at room temperature or at temperatures up to 200° C., optionally using a centrifugal casting process. At this stage, reinforcing elements in the form of inorganic and/or organic or metal wires, fibers, non-woven webs, foams, fabrics, supporting structures, etc., may be incorporated in the foaming mixture. This may be achieved, for example, by the fibrous-web-impregnation process or by processes in which the reaction mixtures and reinforcing fibers are together applied to the mold, for example, by means of a spray apparatus. The molded products obtainable in this way may be used as building elements, e.g., in the form of optionally foamed sandwich elements which may be used directly or subsequently laminated with metal, glass, plastics, etc. The fire characteristics of the material are good, but are improved by the addition of flame-retardant agents and also by the addition of the oxidated silicon compounds. On the other hand, the products may be used as hollow bodies, e.g., as containers for goods which are required to be kept moist or cool, or they may be used as filter materials or exchangers, as catalyst carriers or carriers of other active substances, as decoration elements, shock-resistant packaging, furniture components and cavity fillings. They may also be used in production of molds for metal casting and in model building. The cellular products may also be produced by pouring the components into a mold, then mixing well, after which the mixture expands, then hardens in the mold. The mold may be in the form of a large slab so that it can be sawed into various sizes, shapes and thicknesses as desired. The reaction mixtures may also be foamed up and hardened while in the form of droplets or may be dispersed, e.g., in petroleum hydrocarbons or while they are under condition of free fall. Foam beads are obtained in this way. The foamed products produced by these methods may also be added in a crumbly form to soil, optionally with the addition of fertilizers and plant-protective agents so as to improve the agricultural consistency of the soil. Foams which have a high water content may be used as substrates for the propagation of seedlings, shoots and plants or for cut flowers. The mixtures may be sprayed on terrain which is impassible or too loose, such as dunes or marshes, to strengthen such terrain so that it will be firm enough to walk on within a short time, and will be protected against erosion. The foaming mixtures may also be used underground in caves, mines, tunnels, etc., by spraying the foaming mixture onto wire mesh, fiberglass cloth, woven fabrics or directly on the walls, to produce protective layers to prevent accidents.

It is also possible to introduce into the foaming reaction mixtures, providing they are still free-flowing, organic and/or organic foamable or already foamed particles such as expanded clay, expanded glass, wood, popcorn, cork, hollow beads of plastics, for example, vinyl chloride polymers, polyethylenes, styrene polymers or foam particles thereof or even, for example, polysulphone, polyepoxide, polyurethane, ureaformaldehyde, phenol formaldehyde, polyimide polymers, or to allow the reaction mixtures to foam through interstitial space in packed volumes of these particles, and in this way to produce insulating materials which are distinguished by excellent flame behavior. Combinations of expanded clay, glass, or slate with the reaction mixtures, according to the invention, are especially preferred.

These polyisocyanate cellulose, polyurethane cellulose, polyurethane cellulose silicate and polyisocyanate cellulose silicate cellular products are soluble in organic solvents and may be utilized as paints, varnishes, adhesives, fillers, caulking material, etc.

The object of the present invention is to provide a novel process to produce alkali metal cellulose polymers from cellulose-containing plants. Another object is to produce novel alkali metal cellulose polymers which are highly reactive and are water soluble. Still another object is to produce novel alkali metal cellulose which will produce a gas, $CO_2$, when reacted with an acid compound, thereby producing a foamed cellulose product. Another object is to produce novel cellulose polymers. Still another object is to provide alkali metal cellulose polymers which will react chemically with aldehydes to produce novel aldehyde cellulose polymers and foams. Another object is to produce novel alkali metal cellulose polymers that will react with aldehydes and amino compounds to produce novel aminoplast cellulose resins and foams. Another object is to produce alkali metal cellulose polymers that will react with aldehyde compounds and phenol compounds to produce novel phenoplast cellulose resins and foams. Another object is to produce alkali metal cellulose polymers that will react with polyisocyanate compounds and polyurethane prepolymers to produce novel resins and cellular products. Another object is to produce alkali metal cellulose polymers that will react with polyurethane prepolymers and oxidated silicon compounds to produce novel polyurethane-cellulose-silicate resins and cellular solid products.

DESCRIPTION OF PREFERRED EMBODIMENTS

My invention will be illustrated in greater detail by the specific examples which follow, it being understood that these preferred embodiments are illustrative of, but not limited to, procedures which may be used in the production of alkali metal cellulose polymers. Parts and percentages are by weight unless otherwise indicated.

EXAMPLE 1

About 1 part by weight of lye flakes (NaOH) and 2 parts by weight of fir sawdust are mixed, then heated to 150° C. to 220° C. while agitating at ambient pressure, with care being taken for the mixture not to burn, for 5 to 60 minutes or until the mixture softens and expands into a dark-brown, thick liquid when hot. It cools to a solid, thereby producing an alkali metal cellulose polymer, sodium cellulose.

About three-fourths of the original sawdust is soluble in water, and the other fourth is soluble in organic solvents such as alcohols.

EXAMPLE 2

About equal parts by weight of dry pine sawdust and sodium hydroxide flakes, 20 gm. each, are mixed in a beaker, then heated to about 150° C. while agitating for about 5 minutes; the mixture begins to expand, and is removed from the external source of heat. The mixture continues to soften and expand as the temperature rises to about 180° C. to 220° C., thereby producing a dark-brown, thick liquid while hot which then cools to a solid product. About 90% of the original sawdust is soluble in water.

EXAMPLE 3

About 2 parts by weight of potassium hydroxide and 3 parts by weight of white oak sawdust are mixed, then heated to 150° C. to 220° C. while agitating at ambient pressure for 5 to 60 minutes or until all the sawdust softens and expands into a thick liquid, thereby producing potassium cellulose polymer.

Example 4

About 2 parts by weight of sodium hydroxide and 3 parts by weight of dry small particles of the various woods listed below are mixed, then heated to 150° C. to 220° C. while agitating at ambient pressure for 5 to 60 minutes, thereby producing sodium cellulose polymer.

The wood is selected from the group consisting of fir, pine, redwood, cedar, oak, spruce, gum, hemlock, walnut, hickory, eucalyptus, birch, poplar, beech, maple, mahogany, aspen, ash, cypress, elm, cherry, sycamore, and mixtures thereof.

Example 5

About 2 parts by weight of sodium hydroxide flakes and 3 parts by weight of cellulose in the form of cotton are mixed, then heated to 150° C. to 220° C. while agitating at ambient pressure for 5 to 60 minutes, thereby producing sodium cellulose polymer.

Other cellulose products may be used in place of cotton, such as wood pulp with lignin removed by soda process, wood pulp with lignin removed by the acid sulfite process, wood pulp from waste paper and mixtures thereof.

EXAMPLE 6

About 2 parts by weight of sodium hydroxide flakes and 3 parts by weight of small particles of dried seaweed are mixed, then heated while agitating to 150° C. to 220° C. for 5 to 60 minutes, thereby producing a water-soluble mixture of sodium alginate and sodium cellulose with alginic acid still attached to the cellulose.

EXAMPLE 7

About 2 parts by weight of sodium hydroxide flakes and 4 parts by weight of dry small particles of seaweed with the alginic acid extracted with a sodium carbonate solution are mixed, then heated to 150° C. to 220° C. while agitating for 5 to 60 minutes, thereby producing sodium cellulose polymer.

EXAMPLE 8

About 2 parts by weight of sodium hydroxide flakes, 2 parts by weight of dried seaweed and 1 part by weight of fir sawdust are mixed, then heated to 150° C. to 220° C. while agitating for 5 to 60 minutes, thereby producing sodium cellulose and sodium alginate polymers.

EXAMPLE 9

About 3 parts by weight of dry corn cobs ground into small particles about the size of sawdust and 2 parts by weight of sodium hydroxide flakes are mixed, then heated to 150° C. to 220° C. while agitating for 5 to 60 minutes, thereby producing a water-soluble, dark-brown sodium cellulose polymer.

Other agricultural cellulose-containing plants may be used in place of corn cobs, such as corn stalks, cotton stalks, rice straw, wheat straw, oat straw, barley straw, soybean stalks, cane sugar stalks (bagasse), pea vines, bean vines, sugar beet waste, sorghum stalks, tobacco stalks, maize stalks, buckwheat straw and mixtures thereof.

EXAMPLE 10

About 2 parts by weight of sodium hydroxide, 1 part by weight of sawdust from spruce wood, 1 part by weight of chopped dry seaweed and 1 part by weight of ground cotton stalks are mixed, then heated to 150° C. to 220° C. while agitating for 5 to 60 minutes, thereby producing sodium cellulose containing a small amount of sodium lignin and sodium alginate.

EXAMPLE 11

About 2 parts by weight of sodium hydroxide flakes and 3 parts by weight of dried ground garden plants, containing about equal parts by weight of tomato plants, bean plants, pea vines, potato plants, grass and weeds, are mixed, then heated to 150° C. to 220° C. while agitating for 5 to 60 minutes, thereby producing sodium cellulose polymer.

EXAMPLE 12

About 1 part by weight of sodium hydroxide flakes and 3 parts by weight of dried algae are mixed, then heated to 150° C. to 220° C. while agitating for 5 to 60 minutes, thereby producing sodium hemicellulose polymer.

EXAMPLE 13

About 2 parts by weight of sodium hydroxide flakes, 1 part by weight of pine wood sawdust, 1 part by weight of dry algae and 1 part by weight of dry particles of Johnson grass are mixed, then heated to 150° C. to 220° C. while agitating for 5 to 60 minutes, thereby producing sodium cellulose polymer.

EXAMPLE 14

About 4 parts by weight of the sodium cellulose polymer as produced in Example 1 are added to 6 parts by weight of water, then filtered. About 0.5 part by weight of the sodium cellulose polymer is not soluble in water. Hydrochloric acid is added to the aqueous solution of sodium cellulose until the pH is about 7, carbon dioxide is given off and cellulose polymer precipitates out. The aqueous solution is filtered off, thereby recovering the cellulose polymer. The aqueous solution is evaporated and contains about 0.5 part by weight of lignin and cellulose.

EXAMPLE 15

About 4 parts by weight of the sodium cellulose polymer as produced in Example 1 is mixed with 2 parts by weight of water to form a thick paste; then an aqueous solution containing about 50% sodium hydrogen sulfate is added to the sodium cellulose polymer in the amount to produce a pH of about 6 to 7 and is rapidly mixed. The mixture expands 3 to 4 times its original volume to produce a cellular solid cellulose polymer. The sodium sulfate is removed by washing and filtering.

EXAMPLE 16

About 4 parts by weight of the sodium cellulose polymer as produced in Example 2 are mixed with 8 parts by weight of water. The sodium cellulose aqueous solution is filtered, and about 0.2 part by weight of the sodium cellulose polymer is not soluble. Dilute sulfuric acid is added to the aqueous solution until the pH is 6 to 7; carbon dioxide evolves, and the cellulose polymer is precipitated. The aqueous solution is filtered, thereby recovering the cellulose polymer. The aqueous solution is evaporated, and about 0.5 part by weight of cellulose and lignin is recovered.

EXAMPLE 17

4 parts by weight of the sodium cellulose polymer as produced in Example 1 are mixed with 6 parts by weight of an aqueous solution containing 37% formaldehyde, then heated to 70° C. to 100° C. while agitating for 30 to 120 minutes, thereby producing a formaldehyde sodium cellulose copolymer.

EXAMPLE 18

About 4 parts by weight of the formaldehyde sodium cellulose copolymer as produced in Example 15 are mixed with phosphoric acid until the pH is about 6 to 7; the mixture expands 3 to 6 times its original volume, thereby producing an aldehyde-cellulose cellular solid product.

Example 19

About 3 parts by weight of the potassium cellulose polymer as produced in Example 3 and 2 parts by weight of furfural are mixed, then agitated at ambient temperature for 10 to 120 minutes, thereby producing an aldehyde-potassium cellulose copolymer.

Other aldehydes may be used in place of furfural such as formaldehyde, acetaldehyde, propionaldehyde, crotonaldehyde, acrolein, butyl aldehyde, pentanals, hexanals, heptanals, octanals, and mixtures thereof.

EXAMPLE 20

To about 3 parts by weight of each of the aldehyde-potassium cellulose copolymers produced in Example 19 is added an acid compound, hydrochloric acid, until the pH is 6 to 7. The mixture expands 3 to 6 times its original volume, thereby producing a cellular solid aldehyde-cellulose product.

Other acid compounds may be used in place of hydrochloric acid such as mineral acids, organic acids, inorganic hydrogen-containing salts and mixtures thereof.

EXAMPLE 21

2 parts by weight of sodium cellulose polymer as produced in Example 1, 1 part by weight of urea and 3 mols of an aqueous solution containing 37% formaldehyde for each mol of urea are mixed, then agitated at a temperature between ambient temperature and 100° C. for 10 minutes to 12 hours, thereby producing an aminoplast-alkali metal cellulose resin.

EXAMPLE 22

To about 2 parts by weight of the aminoplast-alkali metal cellulose resin produced in Example 21 are added about equal parts by weight of concentrated hydrochloric and phosphoric acid until the pH is 5 to 7. The components are rapidly mixed, the mixture expanding 3 to 10 times its original volume, thereby producing a rigid cellular solid aminoplast-cellulose product.

EXAMPLE 23

2 parts by weight of the sodium cellulose polymer as produced in Example 1, 1 part by weight of the sodium cellulose polymer containing the sodium alginate as produced in Example 6, 2 parts by weight of an amino compound, selected from the list below, and 5 mols of an aldehyde for each mol of the amino compound, selected from the list below, are mixed, then agitated at a temperature between ambient temperature and 100° C for 10 minutes to 12 hours, thereby producing an aminoplast-alkali metal cellulose resin.

| Example | Amino Compound | Aldehyde |
|---|---|---|
| a | urea | acetaldehyde |
| b | thiourea | propionaldehyde |
| c | melamine | crotonaldehyde |
| d | 1,3-dibutylthiourea | furfural |
| e | 1,3-dibutylurea | acrolein |
| f | ethylenediamine | butyl aldehyde |
| g | propylenediamine | benzaldehyde |
| h | diethylenetriamine | formaldehyde |
| i | 1,3-dipropylurea | paraformaldehyde |
| j | aniline | formaldehyde |

EXAMPLE 24

To about 2 parts by weight of each of the aminoplast-alkali metal cellulose resins produced in Example 23 is added an acid compound, hydrochloric acid, until the pH is 6 to 7, while rapidly mixing. The mixture expands 3 to 10 times its original volume, thereby producing cream-colored, rigid, cellular solid aminoplast-cellulose products.

Other acid compounds may be used in place of hydrochloric acid such as other mineral acids, organic acids, salt-producing organic compounds, inorganic hydrogen-containing salts and mixtures thereof.

EXAMPLE 25

About 2 parts by weight of an alkali metal cellulose polymer, listed below, 1 part by weight of a phenol compound, listed below, and 3 mols of an aqueous solution of formaldehyde for each mol of the phenol compound are mixed, then agitated at a temperature between ambient and 100° C. for 10 minutes to 12 hours, thereby producing a phenoplast-alkali metal cellulose resin.

| Example | Alkali metal cellulose polymer | Phenol compound |
|---|---|---|
| a | of Example 1 | phenol |
| b | of Example 2 | cresol |
| c | of Example 3 | creosote |
| d | of Example 4 | p-cresol |
| e | of Example 5 | o-cresol |
| f | of Example 6 | m-cresol |
| g | of Example 7 | cresylic acid |
| h | of Example 8 | resorcinol |
| i | of Example 9 | cashew nut shell liquid |
| j | of Example 10 | Bisphenol A |

| Example | Alkali metal cellulose polymer | Phenol compound |
|---|---|---|
| k | of Example 11 | 2,6-dimethylphenol |
| l | of Example 12 | p-tert-butyl phenol |

EXAMPLE 26

To each of the phenoplast-alkali metal cellulose resins produced in Example 25 is added an acid compound phosphoric acid until the pH is 6 to 7 while rapidly mixing. The mixture expands 3 to 10 times its original volume, thereby producing a cellular solid phenoplast-cellulose product.

EXAMPLE 27

Example 25 is modified, wherein 1 part by weight of urea is added to the phenol compound, thereby producing an aminoplast-phenoplast-alkali metal cellulose resin; than in Example 26 a light-brown-colored, cellular solid aminoplast-phenoplast-cellulose product is produced.

EXAMPLE 28

About 2 parts by weight of the sodium cellulose polymer, as produced in Example 1, 2 parts by weight of urea, 0.5 part by weight of cresylic acid and 3 mols of an aqueous solution of formaldehyde for each mol of urea and cresylic acid are mixed at 50° C.; then 0.5 part by weight of chloroform and sufficient hydrochloric acid are added to produce a pH of 6 to 7 while rapidly mixing. The mixture expands 3 to 10 times its original volume, thereby producing a light-brown, rigid, tough, cellular solid aminoplast-phenoplast-cellulose product.

EXAMPLE 29

About 2 parts by weight of an alkali metal cellulose, as produced in Example 1, and 1 part by weight of tolylene diisocyanate are mixed, then agitated for 10 to 60 minutes at a temperature between 20° C. to 70° C., thereby producing a polyisocyanate-alkali metal cellulose prepolymer. Then 0.4 part by weight of water containing 5% triethylamine is added to the prepolymer while agitating for 5 to 20 minutes or until the mixture begins to expand. It expands 3 to 10 times its original volume, thereby producing a light-brown-colored, tough, cellular solid polyisocyanate-cellulose product.

Other alkali metal cellulose polymers may be added in place of that produced in Example 1, such as those produced in Examples 2, 3, 4, 5, 6, 7, 8, 9, 10, 11, 12 and mixtures thereof.

Other curing agents may be used in place of the water containing 5% by weight of triethylamine such as water, water containing 1% to 10% by weight of other amine catalysts, water containing 10% to 60% by weight of a polyhydroxy compound, water containing 10% to 60% by weight of silica sol, water containing up to 5% by weight of an emulsifying agent, water containing 10% to 50% by weight of sodium silicate and mixtures thereof.

EXAMPLE 30

About 2 parts by weight of a powdered alkali metal cellulose polymer, as listed below, 2 parts by weight of a polyol, listed below, and 2 parts by weight of tolylene diisocyanate (80% 2,4-isomer and 20% 2,6-isomer) are added simultanelusly, then rapidly mixed. In a few seconds to 10 minutes, the mixture expands about 8 to 12 times its original volume to produce a rigid, tough, cellular solid polyurethane cellulose product.

| Example | Alkali metal celluose polymer | Polyol |
|---|---|---|
| a | as produced in Example 1 | glycerol |
| b | as produced in Example 2 | triethylene glycol |
| c | as produced in Example 3 | propylene glycol |
| d | as produced in Example 4 | butylene glycol |
| e | as produced in Example 5 | polyethylene glycol (mol. wt. 480) |
| f | as produced in Example 6 | polypropylene glycol (mol. wt. 500) |
| g | as produced in Example 7 | polyethylene glycol (mol. wt. 1000) |
| h | as produced in Example 8 | polyethylene glycol (mol. wt. 1500) |
| i | as produced in Example 9 | polyester (3.8 mols glycerol, 2.5 mols adipic acid, and 0.5 mol phthalic acid) |
| j | as produced in Example 10 | polyester (16 mols of adipic acid, 16 mols of diethylene glycol and 1 mol of trimethylol propane) |
| k | as produced in Example 11 | polyether (polyepichlorohydrin) |
| l | as produced in Example 12 | liquid hydroxyl-terminated polybutadiene having 20% pendant vinyl groups (Poly B-D R45M, Arco Chemical Co.) |
| m | as produced in Example 1 and mixed with equal parts as produced in Example 5 | Liquid polysulfide polymer containing hydroxyl groups |
| n | as produced in Example 3 | castor oil |

EXAMPLE 31

About 2 parts by weight of the powdered potassium cellulose polymer as produced in Example 3, and 2 parts by weight of the powdered sodium cellulose polymer and sodium alginate, as produced in Example 6, and 5 parts by weight of an isocyanate-terminated polyurethane prepolymer, listed below, are thoroughly mixed; then in a few seconds to about 10 minutes, the mixture begins to expand, expanding 3 to 12 times its original volume to produce a tough, rigid, cellular solid, polyurethane cellulose product.

| Example | Isocyanate-terminated polyurethane prepolymer |
|---|---|
| a | toluene diisocyanate with polypropylene glycol (mol. wt. 520) in an NCO/OH ratio of 25:1. |
| b | 20% solution of a distillation residue of the distillation of commercial tolylene diisocyanate in a crude phosphosgenation product of an aniline-formaldehyde condensation with an NCO content of about 30%, with polyethylene glycol (mol. wt. 1000) to produce an isocyanate-terminal polyurethane prepolymer with an NCO content of about 17%. |
| c | diisocyanatodiphenylmethane with a tetrafunctional polypropylene glycol (mol. wt. 500) to produce a prepolymer having about 22% NCO groups. |
| d | toluene diisocyanate with a liquid hydroxyl-terminated polybutadiene (mol. wt. about 1000) available from Arco Chemical Co. under the trade designation of "POLY B-D R-15M" and "POLY B-D R45M" to produce a prepolymer with an NCO content of about 7%. |
| e | toluene diisocyanate with castor oil to produce a prepolymer with an NCO content of about 15%. |
| f | toluene diisocyanate with a hydroxyl-group-containing polysulfide polymer to produce a prepolymer with an |

-continued

| Example | Isocyanate-terminated polyurethane prepolymer |
|---|---|
|   | NCO content of about 12%. |
| g | methylene bis-phenyl diisocyanate with a liquid polyepichlorohydrin to produce a prepolymer of about 16% and 25% by weight of a resin extender, polyalpha-methylstyrene, is added, percentage based on weight of prepolymer. |
| h | polyphenyl-polymethylene-isocyanate with polyethylene oxide monohydric alcohol (mol. wt. 1145), initiated on trimethylol propane to produce a prepolymer with an NCO content of about 18%. |
| i | residue of tolylene diisocyanate distillation with about 20% by weight of NCO with polyethylene glycol (mol. wt. 1500) to produce a prepolymer with an NCO content of about 11%. |
| j | tolylene diisocyanate with a polyester (4 mols of glycerol, 2.5 mols of adipic acid and 0.5 mol of phthalic anhydride) to produce a prepolymer with an NCO content of about 23%. |
| k | tolylene diisocyanate with polyethylene (mol. wt. 2000) to produce a prepolymer with an NCO content of about 28%. |

EXAMPLE 32

About 2 parts by weight of sodium cellulose polymer as produced in Example 2 is mixed with 2 parts by weight of water to produce a thick aqueous solution which is then mixed thoroughly with 0.01 part by weight of triethyleneamine and 3 parts by weight of tolylene diisocyanate. The mixture begins to expand in 1 to 20 minutes. It expands 3 to 10 times its original volume, thereby producing a rigid, cellular solid, polyisocyanate-silicate product.

EXAMPLE 33

About 4 parts by weight of sodium cellulose polymer as produced in Example 1 are mixed with 5 parts by weight of water, 0.02 part by weight of triethanolamine, 0.05 part by weight of sodium dioctyl sulfosuccinate and 0.1 part by weight of trichlorofluoromethane, then thoroughly mixed with an organic polyisocyanate, listed below. The mixture expands 3 to 10 times its original volume, thereby producing a rigid, cellular solid polyisocyanate-silicate product.

The polyisocyanates used in this Example are: tolylene-2,4-and -2,6-diisocyanate and mixtures thereof, polyphenyl-polymethylene-isocyanate, diisocyanatodiphenylmethane, methylene bis phenyl diisocyanate, residue of tolylene diisocyanate with about 20% by weight of NCO, metaphenylene, sulphonated polyphenyl-polymethylene-polyisocyanate (sulphur content: about 1%, isocyanate content: 30%) and 20% solution of a distillation residue of the distillation of commercial tolylene diisocyanate in diisocyantodiphenylmethane.

EXAMPLE 34

Example 31 is modified, wherein water is added to the alkali metal cellulose polymer to produce an aqueous solution containing 50% by weight of alkali metal cellulose, thereby producing polyurethane cellulose cellular solid products.

EXAMPLE 35

An aqueous solution containing 60% sodium cellulose polymer, as produced in Example 1, and 1% by weight of triethylamine are mixed with an isocyanate-terminated polyurethane prepolymer, which was produced by reacting tolylene diisocyanate with polyethylene (mol. wt. 1000), in the ratio of 3 parts by weight of the aqueous solution to 5 parts by weight of the prepolymer. The mixture expands to 3 to 10 times the original volume, thereby producing a tough, rigid, cellular solid polyurethane-cellulose product.

EXAMPLE 36

About 2 parts by weight of an alkali metal cellulose polymer as produced in Example 1, 2 parts by weight of a fine, granular oxidated silicon compound, hydrated silica, 1 part by weight of a polyol, polyethylene glycol (mol. wt. 1000) and 3 parts by weight of a polyisocyanate, tolylene diisocyanate, are simultaneously mixed in a rapid-speed mixer and then poured into a mold. The mixture expands 3 to 10 times its original volume, thereby producing a tough, light-brown-colored, cellular solid polyurethane silicate product.

Other oxidated silicon compounds may be used in place of hydrated silica such as silica, e.g., silicoformic acid, polysilicoformic acid, silicic acid gel, silica sol, etc.; alkali metal silicates, e.g., sodium silicate, potassium silicate, lithium silicate, etc.; alkaline earth metal sulicates, e.g., calcium silicate, natural silicates with free silicic acid groups, ammonium silicate; and mixtures thereof.

Example 37

About 2 parts by weight of fine granular potassium cellulose polymer, as produced in Example 1, 3 parts by weight of silica sol, 2 parts by weight of a polyester (containing 16 mols of adipic acid, 16 mols of diethylene glycol and 1 mol of trimethylol propane), 2 parts by weight of tolylene diisocyanate and 1 part by weight of polyphenyl-polymethylene-isocyanate are thoroughly and rapidly mixed at ambient temperature. The mixture begins to expand in a few seconds to 10 minutes and expands 3 to 10 times its original volume, thereby producing a tough, light-brown-colored, cellular solid polyurethane silicate product.

Example 38

About 2 parts by weight of the powdered sodium cellular polymer, as produced in Example 5, 1 part by weight of sodium silicate, 2 parts by weight of polypropylene glycol (mol. wt. 500) and 3 parts by weight of polyphenyl-polymethylene-isocyanate are thoroughly and rapidly mixed at ambient temperature and pressure. The mixture begins to expand in a few seconds to 10 minutes and expands 3 to 10 times its original volume, thereby producing a tough, cellular solid polyurethane silicate product.

Although specific materials and conditions were set forth in the above Examples, these were merely illustrative of preferred embodiments of my invention. Various other compositions, such as the typical materials listed above, may be used where suitable. The reactive mixtures and products of my invention may have other agents added thereto in order to enhance or otherwise modify the reaction and products. Other modifications of my invention will occur to those skilled in the art upon reading my disclosure. These are intended to be included within the scope of my invention, as defined in the appended claims.

I claim:

1. The process for the production of water-soluble broken-down alkali metal cellulose polymer by the following steps:
   (a) mixing 2 parts by weight of a cellulose-containing plant with 1 to 3 parts by weight of an alkali metal hydroxide;
   (b) heating the mixture at 150° C. to 220° C. while agitating for 5 to 60 minutes, thereby
   (c) producing a water-soluble broken-down alkali metal cellulose polymer.

2. The process of claim 1 wherein the alkali metal hydroxide is selected from the group consisting of sodium hydroxide, potassium hydroxide or mixtures thereof.

3. The process of claim 1 wherein an additional step is taken following step (c) of claim 1 wherein 20% to 200% by weight of water is added, based on the weight of the alkali metal cellulose polymer, to the broken-down alkali metal cellulose polymer, thereby producing an aqueous solution of broken-down alkali metal cellulose polymer.

4. The product produced by the process of claim 1.

5. The process of claim 1 wherein water is added to the alkali metal cellulose polymer, then filtered to remove any insoluble alkali metal cellulose polymer, thereby recovering the alkali metal cellulose not soluble in water.

6. The product produced by the process of claim 5.

7. The process of claim 1 wherein water is added to the alkali metal cellulose polymer, then filtered to remove the insoluble alkali metal cellulose; the alkali metal cellulose polymer is precipitated from the water by the addition of a mineral acid or an organic acid until the pH is 5 to 7, then filtered, thereby recovering the broken-down cellulose polymer.

8. The product produced by the process of claim 7.

9. The process for the production of broken-down cellulose foam by mixing 2 parts by weight of a cellulose-containing plant with 1 to 3 parts by weight of an alkali metal hydroxide selected from the group consisting of sodium hydroxide, potassium hydroxide or mixtures thereof, then heating the mixture at 150° C. to 200° C. while agitating for 5 to 60 minutes, thereby producing a water-soluble broken-down alkali metal cellulose polymer; then 1 to 5 parts by weight of an aldehyde selected from the group consisting of formaldehyde, acetaldehyde, propionic aldehyde, furfural, crotonaldehyde, acrolein, benzaldehyde, butyl aldehyde, pentanals, hexanals, heptanals, octanals and mixtures thereof, are mixed with 2 parts by weight of the broken-down alkali metal cellulose polymer, then agitated at ambient temperature for 10 to 120 minutes, thereby producing an aldehyde-broken-down alkali metal cellulose copolymer, then an acid compound, selected from the group consisting of mineral acid, organic acid, hydrogen-containing salt, and mixtures thereof, is added until the pH is 6 to 7, thereby producing an aldehyde-broken-down cellulose copolymer, a cellular solid product, without the addition of a volatile blowing agent.

10. The product produced by the process of claim 9.

11. The process for the production of aminoplast-broken-down cellulose foam by mixing 2 parts by weight of a cellulose-containing plant with 1 to 3 parts by weight of an alkali metal hydroxide selected from the group consisting of sodium hydroxide, potassium hydroxide or mixtures thereof, then heating the mixture at 150° C. to 220° C. while agitating for 5 to 60 minutes, thereby producing a water-soluble broken-down alkali metal cellulose polymer; then 0.5 to 5 mols of an aldehyde per mol of the amino compound and selected from the group consisting of aqueous solution of formaldehyde, acetaldehyde, propionic aldehyde, furfural, crotonaldehyde, acrolein, butyl aldehyde, pentanals, hexanals, heptanals, octanals, paraformaldehyde and mixtures thereof, 1 to 5 parts by weight of an amino compound, selected from the group consisting of urea, thiourea, alkyl ureas, alkyl thiourea, melamine, polyamines, aniline and mixtures thereof, and 2 parts by weight of the broken-down alkali metal cellulose, are mixed, then agitated at a temperature between ambient temperature and 100° C. for 10 minutes to 12 hours, thereby producing an aminoplast-broken-down cellulose resin; then an acid compound, selected from the group consisting of a mineral acid, an organic acid and inorganic hydrogen-containing salt, is added until the pH is 5 to 7 while agitating until said resin begins to expand, thereby producing a cellular solid aminoplast-cellulose product, without the addition of a volatile blowing agent.

12. The product produced by the process of claim 11.

13. The process for the production of phenoplast-broken-down cellulose foam by mixing 2 parts by weight of a cellulose-containing plant with 1 to 3 parts by weight of an alkali metal hydroxide selected from the group consisting of sodium hydroxide, potassium hydroxide or mixtures thereof, then heating the mixture at 150° C. to 220° C. while agitating for 5 to 60 minutes, thereby producing a water-soluble broken-down alkali metal cellulose polymer, then 1 to 5 parts by weight of a phenol compound, selected from the group consisting of phenol, cresol, creosote, cresylic acid, resorcinol, Bisphenol A, cashew nut shell liquid, 2,6-dimethyl-phenol, p-tert-butyl-phenol and mixtures thereof, 1 to 5 mols of an aldehyde, selected from the group consisting of aqueous solution of formaldehyde, acetaldehyde, propionic aldehyde, furfural, crotonaldehyde, acrolein, butyl aldehyde, paraformaldehyde, pentanals, hexanals and mixtures thereof, and 2 parts by weight of the broken-down alkali metal cellulose are mixed, then agitated at a temperature from ambient to 100° C. for 10 minutes to 12 hours, thereby producing a phenoplast-broken-down alkali metal cellulose resin, then an acid compound, selected from the group consisting of a mineral acid, an organic acid and an inorganic hydrogen-containing salt, or mixtures thereof, is added to said resin while agitating until the pH is 5 to 7, and the mixture begins to expand, thereby producing a cellular solid phenoplast-broken-down cellulose product; 1 to 5 mols of the aldehyde are added for each mol of phenol and no volatile blowing agents are added.

14. The product produced by the process of claim 13.

15. The process of claim 11 wherein additional steps are taken wherein 2 parts by weight of the broken-down alkali metal cellulose as produced in step (c) of claim 1, and 1 to 4 parts by weight of an organic polyisocyanate are mixed, then agitated for 10 to 60 minutes at a temperature between 20° C. to 70° C., thereby producing a polyisocyanate-broken-down cellulose prepolymer, then 10% to 100% by weight of a curing agent, based on weight of the prepolymer, and selected from the group consisting of water, water containing 1% to 10% by weight of an amine catalyst, water containing 10% to 60% by weight of a polyhydroxy compound, water containing 10% to 60% by weight of silica sol, water containing up to 5% by weight of an emulsifying agent, water containing 10% to 50% by weight of sodium silicate, and mixtures thereof, is added to the prepolymer while agitating at 20° C. to 80° C. for 5 to 20 minutes, thereby producing a cellular solid or solid polyisocyanate-broken-down cellulose product.

16. The process of claim 15 wherein the organic polyisocyanate is selected from the group consisting of tolylene-2,4-diisocyanate, tolylene-2,6-diisocyanate and mixtures thereof, and the phosgenation product of an anilineformaldehyde condensation.

17. The product produced by the process of claim 16.

18. The process of claim 1 wherein additional steps are taken wherein 1 to 3 parts by weight of the broken-down alkali metal cellulose, 1 to 3 parts by weight of a polyol, and 1 to 3 parts by weight of an organic polyisocyanate are mixed and the resultant mixture is allowed to react, thereby producing a polyurethane-broken-down cellulose cellular solid product.

19. The product produced by the process of claim 18.

20. The process of claim 18 wherein the organic polyisocyanate is selected from the group consisting of tolylene-2,4-diisocyanate; tolylene-2,6-diisocyanate and mixtures thereof and the phosgenation product of aniline-formaldehyde condensation product.

21. The process of claim 1 wherein 1 to 4 parts by weight of the broken-down alkali metal cellulose and 3 parts by weight of an isocyanate-terminated polyurethane prepolymer are mixed and the resultant mixture is allowed to react, thereby producing a polyurethane-broken-down cellulose cellular solid or solid product.

22. The process of claim 21 wherein the isocyanate-terminated polyurethane prepolymer is selected from the group consisting of an isocyanate-terminated polyester, isocyanate-terminated polyether, isocyanate-terminated polybutadiene, isocyanate-terminated polysulfide and mixtures thereof.

23. The product produced by the process of claim 21.

24. The process of claim 1 wherein additional steps are taken wherein 1 part by weight of the broken-down alkali metal cellulose polymer, as produced in step (c) of claim 1, is added to water to produce an aqueous solution containing 20% to 60% solids, then mixed with 1 to 10 parts by weight of an organic polyisocyanate or polyisothiocyanate, and the resultant mixture is allowed to react, thereby producing a polyisosyanate-broken-down cellulose cellular solid or solid product.

25. The process of claim 24 wherein the polyisocyanate is selected from tolylene-2,4-diisocyanate, tolylene-2,6-diisocyanate and mixtures thereof, and polyphenyl-polymethylene-isocyanates.

26. The product produced by the process of claim 24.

27. The process of claim 1 wherein additional steps are taken wherein 10 parts by weight of an aqueous solution containing 20% to 60% by weight of the broken-down alkali metal cellulose polymer, as produced in step (c) of claim 1, are mixed with 10 to 100 parts by weight of an isocyanate-terminated polyurethane prepolymer and 0.001 to 0.01 part by weight of an amine catalyst and the resultant mixture is allowed to react, thereby producing a polyurethane-broken-down cellulose cellular solid or solid product.

28. The process of claim 27 wherein the isocyanate-terminated polyurethane prepolymer is selected from the group consisting of an isocyanate-terminated polyester, isocyanate-terminated polyether, isocyanate-terminated polybutadiene, isocyanate-terminated polysulfide and mixtures thereof.

29. The product produced by the process of claim 27.

30. The process of claim 1 wherein additional steps are taken wherein 1 to 3 parts by weight of the broken-down alkali metal cellulose polymer, as produced in step (c) of claim 1, 1 to 3 parts by weight of an oxidated silicon compound, selected from the group consisting of silica, alkali metal silicates, alkaline earth metal silicates, natural silicates containing free silicic groups and mixtures thereof, 1 to 3 parts by weight of a polyol and 3 parts by weight of an organic polyisocyanate or polyisothiocyanate are mixed, allowing the resultant mixture to react, thereby producing a polyurethane-silicate-broken-down cellulose cellular solid or solid product.

31. The process of claim 30 wherein the polyisocyanate is selected from the groups consisting of tolylene-2,4-diisocyanate, tolylene-2,6-diisocyanate and mixtures thereof, polyphenyl-polymethylene-isocyanate and mixtures thereof.

32. The product produced by the process of claim 30.

33. The process for the production of a foamed broken-down cellulose polymers which has lost a $CO_2$ radical per each basic polymer unit by mixing 2 parts by weight of a cellulose-containing plant with 1 to 3 parts by weight of an alkali metal hydroxide selected from the group consisting of sodium hydroxide, potassium hydroxide or mixtures thereof, then heating the mixture at 150° C. to 220° C. while agitating for 5 to 60 minutes, thereby producing a water-soluble broken-down alkali metal cellulose polymer, then an acid compound, selected from the group consisting of mineral acids, organic acids, inorganic hydrogen-containing salts and mixtures thereof, is added to the broken-down alkali metal cellulose until the pH is 5 to 7 and the mixture expands, thereby producing a cellular solid broken-down cellulose product, without the addition of a volatile blowing agent.

34. The product produced by the process of claim 33.

35. The process for the production of foamed broken-down lignin-cellulose polymer which has lost a $CO_2$ radical per each basic cellulose polymer unit by mixing 2 parts by weight of a plant containing lignin and cellulose with 1 to 3 parts by weight of an alkali metal hydroxide selected from the group consisting of sodium hydroxide, potassium hydroxide or mixtures thereof, then heating the mixture at 150° C. to 220° C. while agitating for 5 to 60 minutes, thereby producing a water-soluble broken-down alkali metal lignin-cellulose polymer which has lost a $CO_2$ radical per each basic cellulose polymer unit, then an acid compound, consisting of mineral acids, organic acids, inorganic hydrogen-containing salts and mixtures thereof, is added to the broken-down alkali metal lignin-cellulose polymer until the pH is 5 to 7 and the mixture expands, thereby producing broken-down lignin-cellulose foam, without the addition of a volatile blowing agent.

* * * * *